(12) United States Patent
Lusted et al.

(10) Patent No.: US 9,344,146 B2
(45) Date of Patent: May 17, 2016

(54) DE-CORRELATING TRAINING PATTERN SEQUENCES BETWEEN LANES IN HIGH-SPEED MULTI-LANE LINKS AND INTERCONNECTS

(71) Applicant: Intel Corporation, Santa Clara, CA (US)

(72) Inventors: Kent C. Lusted, Aloha, OR (US); Adee O. Ran, Maayan Baruch (IL)

(73) Assignee: Intel Corporation, Santa Clara, CA (US)

(*) Notice: Subject to any disclaimer, the term of this patent is extended or adjusted under 35 U.S.C. 154(b) by 496 days.

(21) Appl. No.: 13/793,063

(22) Filed: Mar. 11, 2013

(65) Prior Publication Data

US 2014/0254640 A1    Sep. 11, 2014

(51) Int. Cl.
| | |
|---|---|
| *H04L 12/28* | (2006.01) |
| *H04B 3/40* | (2006.01) |
| *H04L 5/14* | (2006.01) |
| *H04L 25/02* | (2006.01) |
| *H04J 1/16* | (2006.01) |

(52) U.S. Cl.
CPC .............. *H04B 3/40* (2013.01); *H04L 5/1438* (2013.01); *H04L 25/0204* (2013.01); *H04L 25/0226* (2013.01)

(58) Field of Classification Search
USPC .................................. 370/252, 230, 419, 463
See application file for complete search history.

(56) References Cited

U.S. PATENT DOCUMENTS

| | | | |
|---|---|---|---|
| 8,307,265 B2 * | 11/2012 | Ganga | H03M 13/05 370/470 |
| 2009/0252326 A1 | 10/2009 | Buchmann et al. | |
| 2010/0037283 A1 | 2/2010 | Zhu | |
| 2011/0206141 A1 | 8/2011 | Barrett et al. | |
| 2011/0261682 A1 | 10/2011 | Han | |

(Continued)

FOREIGN PATENT DOCUMENTS

| | | |
|---|---|---|
| TW | 201131994 A | 9/2011 |
| WO | 2012/123969 A2 | 9/2012 |

OTHER PUBLICATIONS

International Search Report and Written Opinion received for PCT Patent Application No. PCT/US2014/019805, mailed on Jul. 8, 2014, 13 Pages.

(Continued)

*Primary Examiner* — John Pezzlo
(74) *Attorney, Agent, or Firm* — Law Office of R. Alan Burnett, P.S.

(57) ABSTRACT

Methods, apparatus and systems for de-correlating training pattern sequences for high-speed links and interconnects. The high-speed links and interconnects employs multiple lanes in each direction for transmitting and receiving data, and may be physically implemented via signal paths in an inter-plane board such as a backplane or mid-plane, or via a cable. During link training, a training pattern comprising a pseudo random bit sequence (PBRS) is sent over each lane. The PBRS for each lane is generated by a PBRS generator based on a PRBS polynomial that is unique to that lane. Since each lane employs a different PRBS polynomial, the training patterns between lanes are substantially de-correlated. Link negotiation may be performed between link endpoints to ensure that the PBRS polynomials used for all of the lanes in the high-speed link or interconnect are unique. Exemplary uses include Ethernet links, Infiniband links, and multi-lane serial interconnects.

29 Claims, 13 Drawing Sheets

| Lane | Polynomial | Seed S10 to S0 | Initial output (left to right) |
|---|---|---|---|
| 0 | $1+x^5+x^6+x^{10}+x^{11}$ | 10101111110 | 11111011111100011100101100111110 |
| 1 | $1+x^5+x^6+x^9+x^{11}$ | 11001000101 | 11111011101100011110011001100101 |
| 2 | $1+x^5+x^6+x^8+x^{11}$ | 11100101101 | 11110011111110101011100100000110 |
| 3 | $1+x^5+x^6+x^7+x^{11}$ | 11110110110 | 11110010111111110100010001101011 |

(56) References Cited

U.S. PATENT DOCUMENTS

| | | | |
|---|---|---|---|
| 2014/0006677 A1* | 1/2014 | Iyer | G06F 13/4291 710/316 |
| 2014/0086264 A1* | 3/2014 | Lusted et al. | 370/470 |
| 2014/0146833 A1* | 5/2014 | Lusted | H04L 12/413 370/437 |
| 2015/0067210 A1* | 3/2015 | Iyer et al. | 710/106 |

OTHER PUBLICATIONS

"IEEE Standard for Ethernet" Section Six, IEEE Std 802.3, 2012, 400 pages.

"IEEE Standard for Ethernet" Section Five, IEEE Std 802.3, 2012, 844 Pages.

Draft Standard for Ethernet Amendment X: "Physical Layer Specifications and Management Parameters for 100 Gb/s Operation Over Backplanes and Copper Cables", IEEE P802.3bj™/D2.0, Mar. 27, 2013, 326 pages.

Office Action received for Taiwan Patent Application No. 103107200, mailed on Dec. 2, 2015, 6 pages of Taiwan Office Action and 1 page of English Search Report.

* cited by examiner

| Lane | Polynomial | Seed S10 to S0 | Initial output (left to right) |
|---|---|---|---|
| 0 | $1 + x^5 + x^6 + x^{10} + x^{11}$ | 10101111110 | 11110111111001110010011001110 |
| 1 | $1 + x^5 + x^6 + x^9 + x^{11}$ | 11001000101 | 11111011101100111001100101 |
| 2 | $1 + x^4 + x^6 + x^8 + x^{11}$ | 11100101101 | 11100110111111011100100010 |
| 3 | $1 + x^4 + x^6 + x^7 + x^{11}$ | 11110101010 | 11100010111111101001001101011 |

DE-CORRELATING TRAINING PATTERN SEQUENCES BETWEEN LANES IN HIGH-SPEED MULTI-LANE LINKS AND INTERCONNECTS

FIELD OF THE INVENTION

The field of invention relates generally to high-speed multi-lane links and interconnects and, more specifically but not exclusively relates to techniques for de-correlating training pattern sequences for such links and interconnects.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever substantial capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services which employ private network infrastructure.

A typical data center deployment includes a large number of server racks, each housing multiple rack-mounted servers or blade servers. Communications between the rack-mounted servers is typically facilitated using the Ethernet (IEEE 802.3) protocol over copper wire cables. In addition to the option of using wire cables, blade servers and network switches and routers may be configured to support communication between blades or cards in a rack over an electrical backplane or mid-plane interconnect.

In recent years, the speed of Ethernet connections over copper wiring has reached the 10 Gigabits per second (Gpbs) and 40 Gpbs level. Moreover, The IEEE (Institute of Electrical and Electronics Engineers) is currently developing a specification (IEEE 802.3bj) defining a new backplane PHY (Physical Layer) type called 100GBASE-KR4 that is targeted for a bandwidth of 100 Gbps over electrical backplanes with a loss up to 33 dB at 7 GHz. A similar specification for a new 100 Gbps over a cable connection called 100GBASE-CR4 is also being defined by the IEEE.

An important aspect of high speed link and interconnect operation is link training During link training, a training signal pattern is transmitted from a transmit port at a first end of the link (i.e., first endpoint) to a receive port at the other (second) link endpoint. The training pattern, among other features, facilitates tuning (e.g., timing adjustments, voltage signal levels) of the link transmitter/receiver pair to account for signal noise and the like, which may lead to data errors. In a similar manner and typically concurrently, link training is also performed between a transmitter at the second link endpoint and a receiver at the first endpoint. For some high speed links, the link or interconnect comprises multiple lanes in each direction, and the training pattern is transmitted over each lane.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 13b is a rear isometric view of the blade server chassis of FIG. 16a;

FIG. 15 is a schematic diagram illustrating an architecture for a network node employing a network chip configured to

DETAILED DESCRIPTION

Embodiments of methods, apparatus and systems for de-correlating training pattern sequences for high-speed links and interconnects are described herein. In the following description, numerous specific details are set forth (such as implementation of a 100 Gbps Ethernet link) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments providing techniques for de-correlating training pattern sequences for high-speed Ethernet links including the proposed 100GBASE-KR4 PHY and 100GBASE-CR4 PHY are disclosed herein. In order to preserve compatibility with existing training mechanisms, some aspects of link training for the 100GBASE-KR4/CR4 PHYs are common to similar aspects defined for the IEEE 10GBASE-KR PHY, which is targeted at 10 Gbps links and is currently employed in various types of equipment such as switches and routers. Additionally, there are other common aspects that are defined in IEEE Std 802.3ap-2007. While these common aspects may be identified and briefly discussed herein, corresponding detailed discussions of how these aspects may operate or be implemented are generally not provided herein in order to not obscure inventive aspects of the embodiments. Other aspects of some embodiments are described in further detail in IEEE P802.3bj Draft 1.2 and IEEE P802.3bh Draft 3.1.

Figure 1:
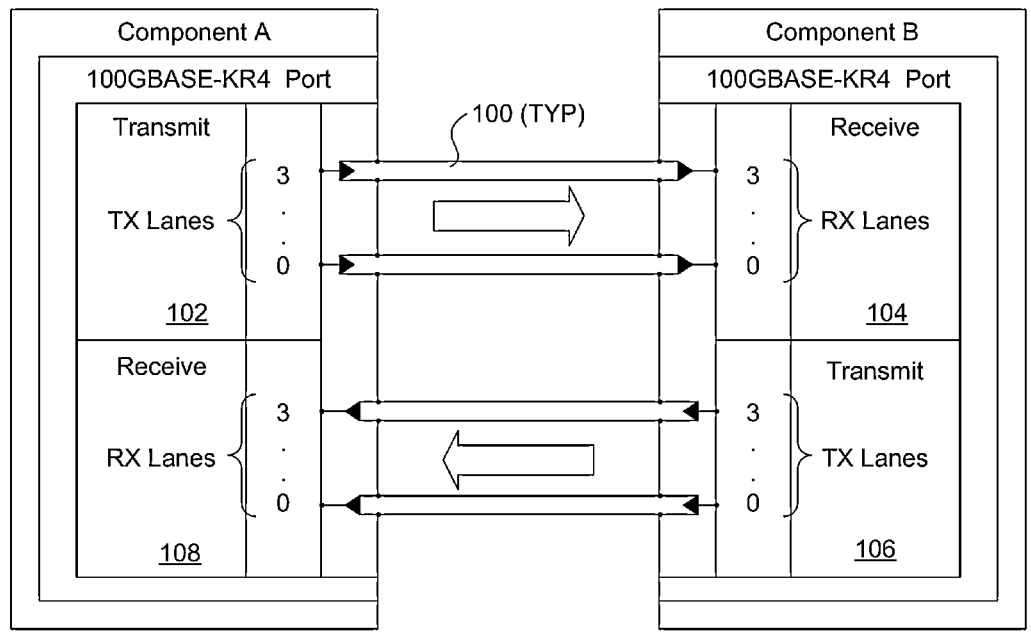
FIG. 1 is a schematic diagram illustrating the structure of a 100GBASE-KR4 link, according to one embodiment.

The Physical layer (also referred to a "PHY") structure of one embodiment of a 100GBASE-KR4 link is illustrated in FIG. 1. The PHY defines the physical structure of the interconnect and is responsible for dealing with details of operation of the signals on a particular link between two link partners (also referred to as endpoints), such as depicted by components A and B. This layer manages data transfer on the signal wires, including electrical levels, timing aspects, and logical issues involved in sending and receiving each bit of information across the parallel lanes. As shown in FIG. 1, the physical connectivity of each interconnect link is made up of four differential pairs of signals 100, comprising lanes 0-3 in each direction. Each port supports a link pair consisting of two uni-directional links to complete the connection between two components. This supports traffic in both directions simultaneously. The PHY structure of a 100GBASE-CR4 link has a similar configuration to that shown in FIG. 1.

Components with 100 GBASE-KR4/CR4 ports communicate using a pair of uni-directional point-to-point links, defined as a link pair, as shown in FIG. 1. Each port comprises a Transmit (Tx) link interface and a Receive (Rx) link interface. For the illustrated example, Component A has a Tx port 102 that is connected to Component B Rx port 104. Meanwhile, Component B has a Tx port 104 that is connected to Component B Rx port 108. One uni-directional link transmits from Component A to Component B, and the other link transmits from Component B to Component A. The "transmit" link and "receive" link is defined relative to which component port is transmitting and which is receiving data. In the configuration illustrated in FIG. 1, the Component A transmit link transmits data from the Component A Tx port 102 to the Component B Rx port 104. This same Component A transmit link is the Port B receive link.

Figure 2A:
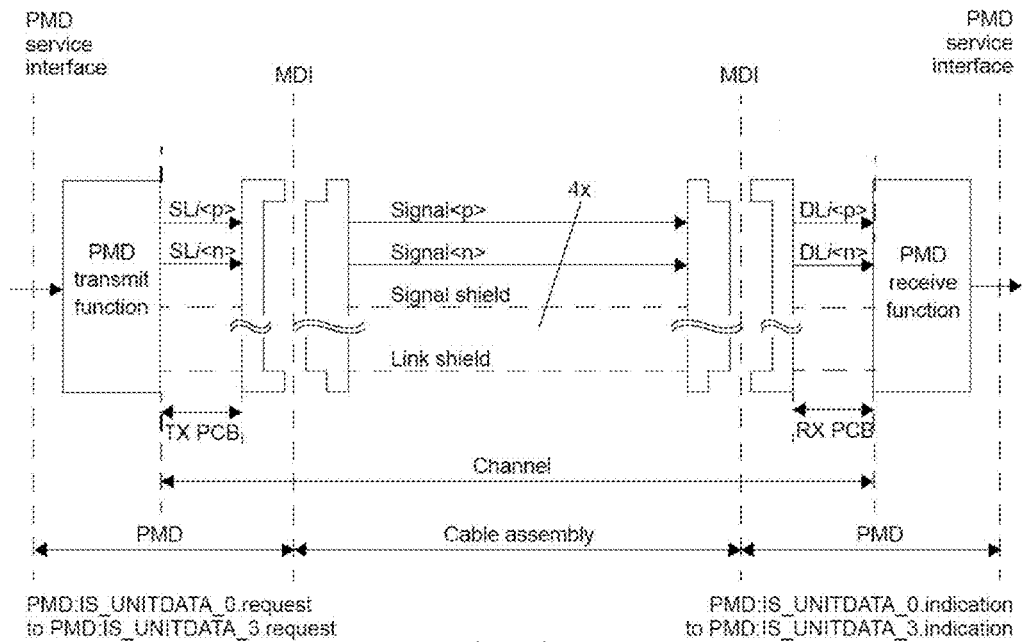
FIG. 2a shows a Physical Media Dependent (PMD) sub-layer link block diagram for a 100GBASE-CR4 link in one direction.
Figure 2B:
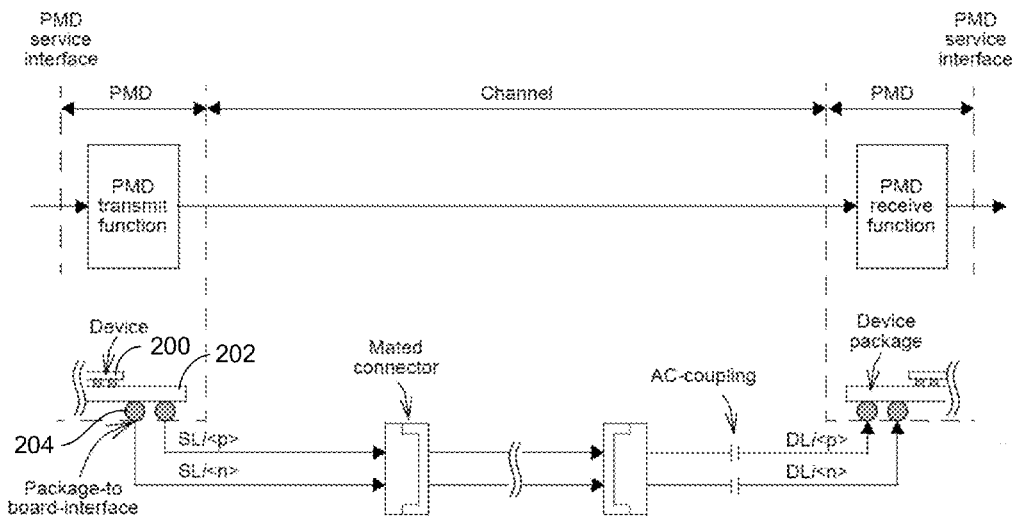
FIG. 2b shows a PMD sub-layer link block diagram for a 100GBASE-KR4 link in one direction.

FIG. 2a depicts a Physical Media Dependent (PMD) sub-layer link block diagram for a 100GBASE-CR4 link in one direction. A similar PMD sub-layer link block diagram for a 100GBASE-KR4 link in one direction is shown in FIG. 2b. Each of 100GBASE-CR4 and 100GBASE-KR4 employ four lanes in each direction, with the signaling for each lane implemented using a differential signal pair. Each of 100GBASE-CR4 and 100GBASE-KR4 also use a 2-level pulse amplitude modulation (referred to as PAM2) signal to send and receive data across the channel. The PAM2 signal consists of two logical levels that are mapped as follows:

0 maps to −1
1 maps to +1

Logical levels 0 and 1 respectively correspond to low and high level signals having signal levels −1 and +1.

The primary difference between 100 GBASE-CR4 and 100GBASE-KR4 is that 100GBASE-CR4 defines use of a cable-based link while 100GBASE-KR4 defines implementation of a link in a circuit board or the like (e.g., in a backplane or mid-plane). As depicted in FIG. 2b, a device 200, such as a network interface controller (NIC) chip with a 100GBASE-KR4 PHY, is coupled to a package 202, which in turn is coupled to a board via solder pads 204. Signal paths are routed in the board on separate layers to facilitate transfer of signals between TX and RX ports on the NIC chip or other Ethernet PHY interface ports.

The 100GBASE-KR4 and 100GBASE-CR4 links are established using the following sequence:

(1) Auto-negotiate capabilities to link partner
(2) Send out training sequence to tune PHY for the channel's characteristics
  Obtain Frame Lock
  TX FFE handshake: Adapt Tx coefficients to channel characteristics
  DSP converged: Train Rx to channel
  Status Exchange Ready or not?
(3) Countdown to data mode and Send out idle symbols The physical signaling for the 100GBASE-KR4 PHY and 100GBASE-CR4 PHY employs a Unit Interval (UI) having a time corresponding to 25.78125 Gbd symbols (−38.8 psec).

Figure 3:
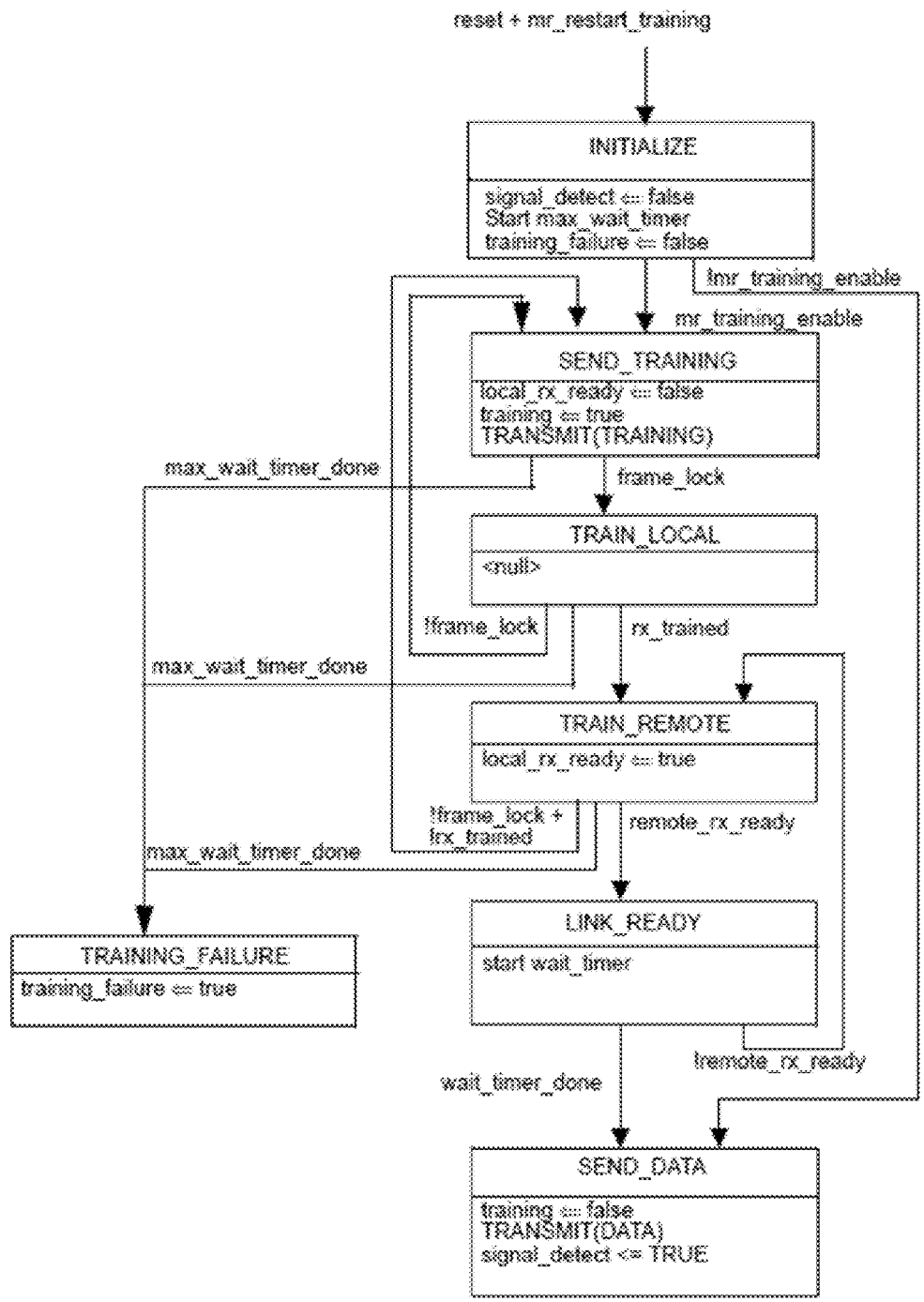
FIG. 3 is a training state diagram for a 10GBASE-KR PHY.

In one embodiment, the format for the training sequence for the 100GBASE-KR4/CR4 PHY is similar to that employed for the 10GBASE-KR PHY defined in the IEEE Std. 802.3ap-2007 specification. The training state diagram for 10GBASE-KR PHY is shown in FIG. 3.

Figure 4A:
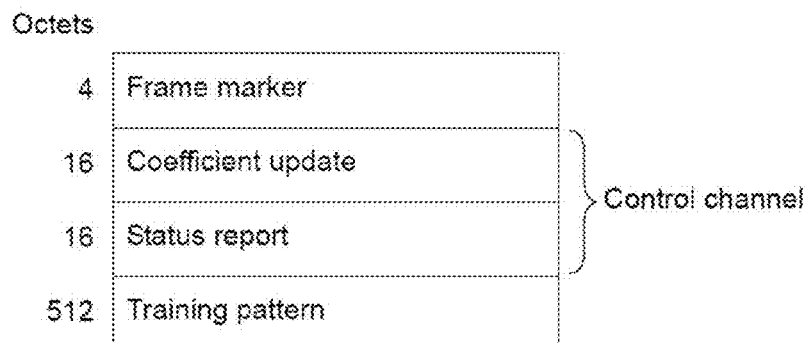
FIGS. 4a and 4b are diagrams illustrating the structure of a link training frame used during training of 100GBASE-KR4 and 100GBASE-CR4 links, according to one embodiment.
Figure 4B:
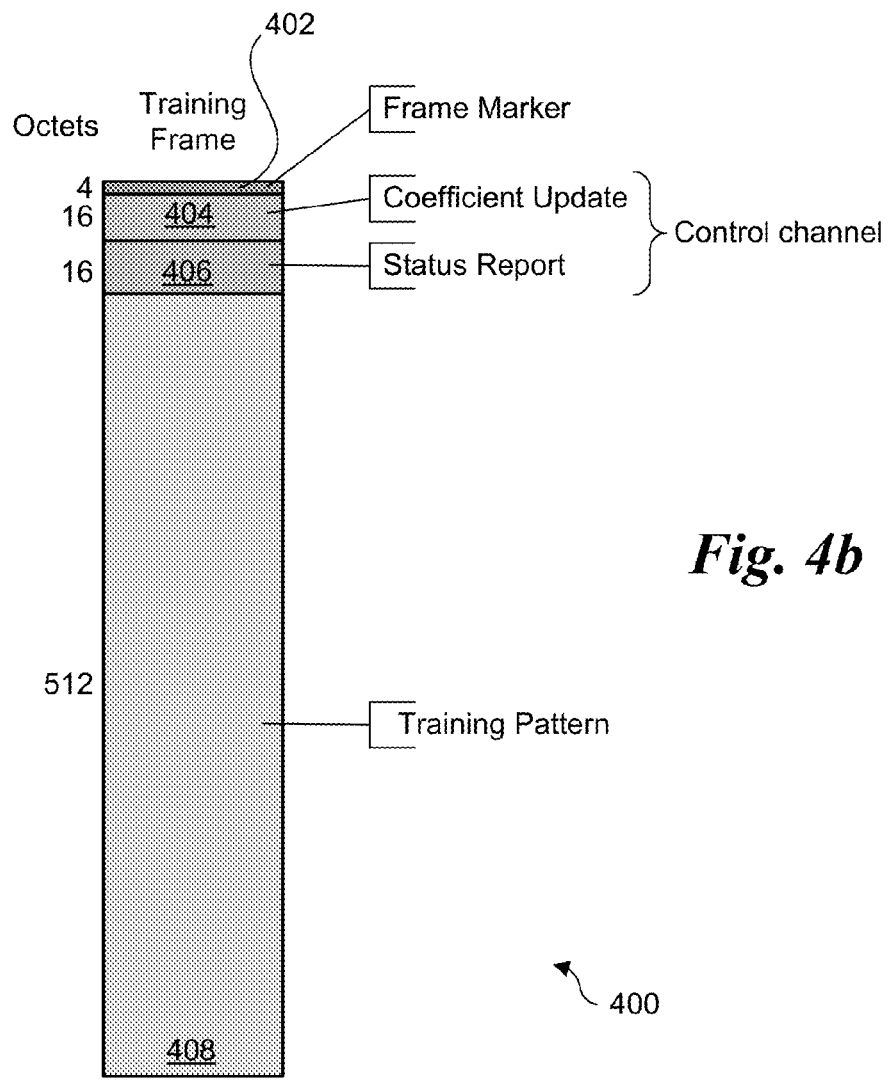

The training frame is a fixed length structure that is sent continuously during training. As shown in FIGS. 4a and 4b, in one embodiment, a training frame 400 includes a Frame Marker 402 comprising 4 octets, a Control Channel including a Coefficient Update 404 comprising 16 octets and a Status Report 406 comprising 16 octets, and a Training Pattern 408 comprising 512 octets for a total of length of 548 octets.

As with the 10GBASE-KR, 40 GBASE-KR4 and 40 GBASE-CR4 PHYs, each of the 100GBASE-KR4 PHY and 100GBASE-CR4 PHY employ a training pattern comprising a 4096-bit Pseudo-Random Bit Sequence, of which the first 4094 bits are generated by an 11-bit Linear feedback Shift Register (LFSR) or any equivalent implementation. The output of the 11-bit LFSR is a periodic sequence of 2047 (=2^11−1) bits, and a single period of that sequence is referred to as a PRBS11 sequence. The 10GBASE-KR PHY specification defines the use of a "random seed" requirement (i.e., the starting point in the PRBS11 sequence should be random). In addition, the 40 GBASE-KR4 and 40 GBAse-CR4 PHYs which use four lanes, require that a different random seed shall be used for each of the four lanes.

Figures 1A, 11:
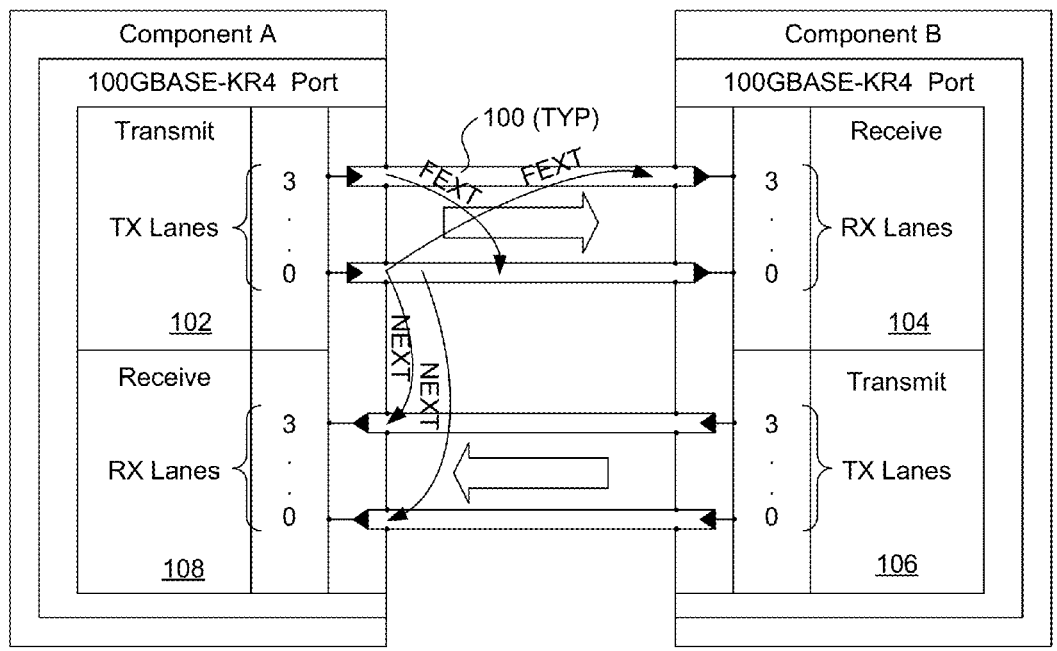
FIG. 1a shows the 100GBASE-KR4 link of FIG. 1, and further depicts examples of far-end cross-talk (FEXT) and near-end cross-talk (NEXT)
FIG. 11 is a diagram illustrating the configuration of an IEEE 802.3 Clause 73 auto-negotiation base page.

Due to far-end cross-talk (FEXT), wherein signals from one transmit lane of a component may be coupled with signals from a nearby transmit lane of the same component, the adaptation of a receiver of one lane can be affected by signals present on adjacent lanes. An example of FEXT in the context of the link configuration of FIG. 1 is illustrated in FIG. 1a. If the training pattern used on one lane is correlated to the training pattern on an adjacent lane, the FEXT effect is indistinguishable from inter-symbol interference (ISI) caused on each individual lane. ISI is typically reduced by adaptive equalization at the receiver, so a receiver can falsely adapt its equalizers to reduce the FEXT during training. When training patterns are replaced by real data, the correlation disappears and the previously adapted equalization increases the FEXT effect instead of reducing it, thus increasing noise and making data errors more probable. Therefore, it is desired to de-correlate training pattern sequences between lanes. Ideally, the correlation between patterns on different lanes should be minimized.

Under the conventional approach defined by 10GBASE-KR PHY, a random number generator is employed to generate the random seeds. First of all, it is difficult to design a true random number generator; rather, reasonable implementations are pseudo-random at best. There is also no standardized definition of the required randomness. For example, seeds 320, 641, 1282, 516, 1032, and 17 appear random, but create PRBS11 patterns that are 1 bit shift apart. Compare this to the non-random sequence of 2, 3, 4, 5, 6, which results in patterns being quite distant from one-another.

Figure 5:
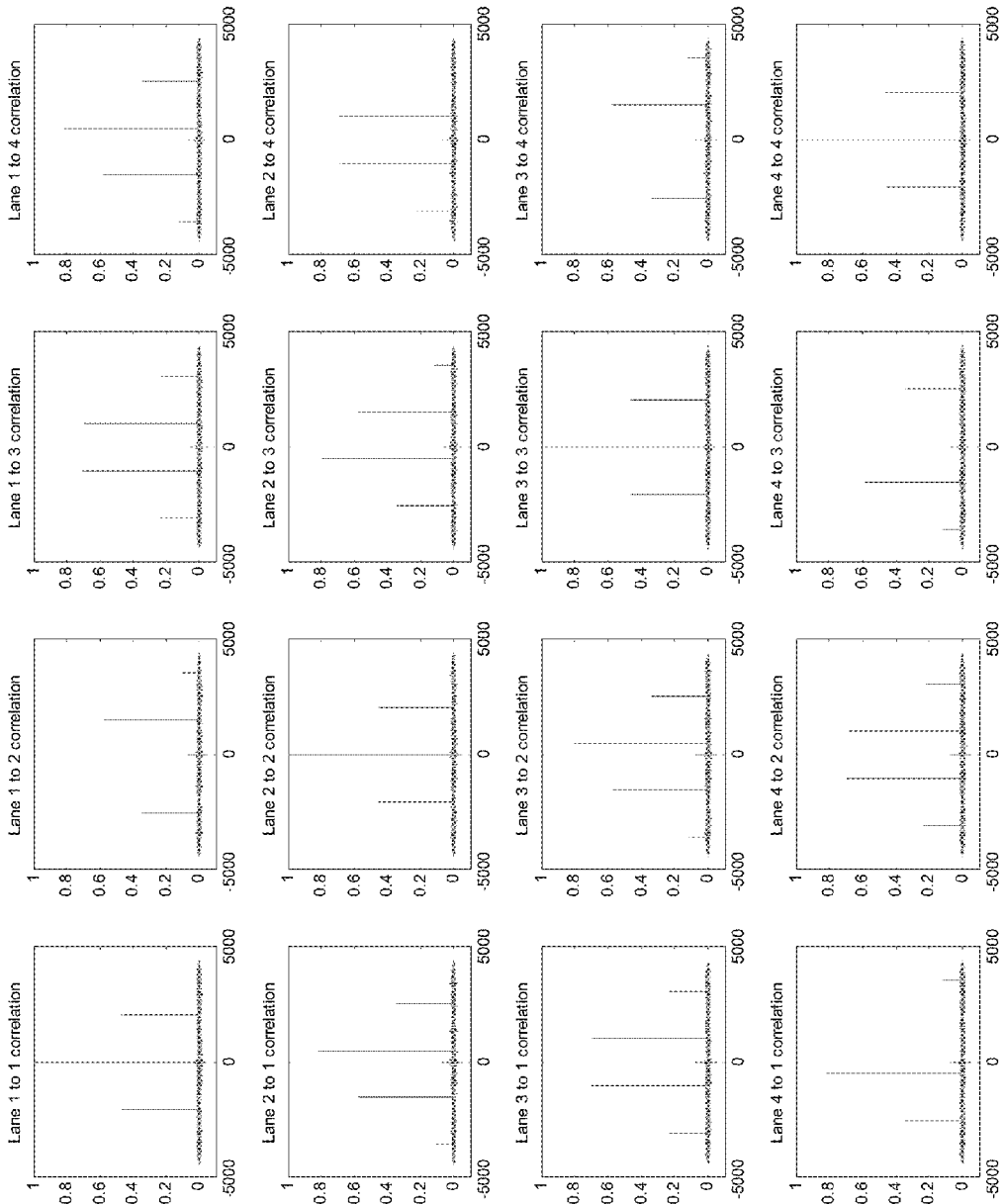
FIG. 5 is a graphic diagram illustrating cross-correlation between bit sequences when using training patterns using the same PBRS11 polynomial with random seeds.

A further example of this problem is illustrated in FIG. 5. Here, 4 lanes use seeds which are separated by a fixed offsets, which is a typical way of choosing different seeds for each lane using one pseudo-random source. The offsets were chosen so that the sequences are 512 UI (¼ of the PRBS11 length) apart. The graphs show cross-correlation between the whole training frame waveforms (marker and control channel included). The results depict sequences that are clearly correlated—so any FEXT signal would be indistinguishable from ISI with some offset (in this case, n*512). Using this seed selection could thus result in wrong receiver adaptation and consequently increased noise level and higher probability of errors after switching from training to data. Due to the lower noise margins for higher-speed links (e.g., 100 Gbps links), the random seed technique employed by 10GBASE-KR PHY is insufficient.

In one embodiment, this correlation problem is addressed by using a different PRBS11 polynomial (and thus different PRBS11 training pattern) per lane. Generally, PRBS11 sequences with different polynomials are practically uncorrelated. As a result, FEXT does not change the adaptation of equalizers in each receiver, and thus increased noise levels and error rates after switching from training to data are prevented.

Figures 6, 7:
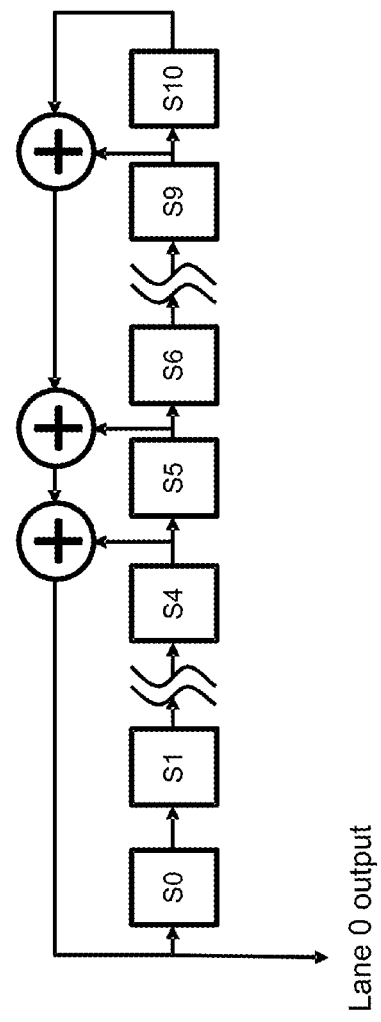
FIG. 6 is a diagram illustrating an exemplary set of four PRBS11 polynomials, seeds, and initial outputs corresponding to four respective lanes, wherein the PRBS11 polynomials and seeds that are used for generating the link training pattern during link training, according to one embodiment.
FIG. 7 is a bit sequence generator diagram illustrating a linear feedback shift register configured in accordance with the PRBS11 polynomial for lane 0 in FIG. 6.

An exemplary set of four different PRBS11 polynomials is shown in FIG. 6. In addition, an exemplary seed and the first 32-bit output sequence resulting from using the seed and the PRBS11 polynomial for each lane is depicted. As shown, the PRBS11 in each lane employs a unique polynomial, beginning with a '1' and ending with $x^{11}$. Under this approach, there are 178 suitable polynomials from which four are selected for a given link direction.

This approach provides several advantages over conventional approaches. Using specified, unique per lane polynomials enables simple identification of lanes even if the interconnect re-orders the differential pair, and thus logically restoring the original data order. Using fixed and specified seeds, rather than random seeds, enables easy verification of the required (i.e., standardized) implementation. The "random and different per lane seeds" requirement is much more difficult to verify. Using different and uncorrelated sequences facilitates implementation of algorithms and circuits for crosstalk cancellation. While the algorithms themselves are known, this novel, inventive approach makes their usage possible during training, which would otherwise be impossible.

FIG. 7 shows one embodiment of a PRBS generator for generating the PRBS11 training pattern corresponding to lane 0. In one embodiment, the training pattern for each lane comprises the first 4094 bits from the output of the PRBS11 generator for that lane, followed by two zeros for a total of 4096 bits. As discussed above, the training frame including this pattern is repeatedly transmitted on each lane during link training.

Figure 8:
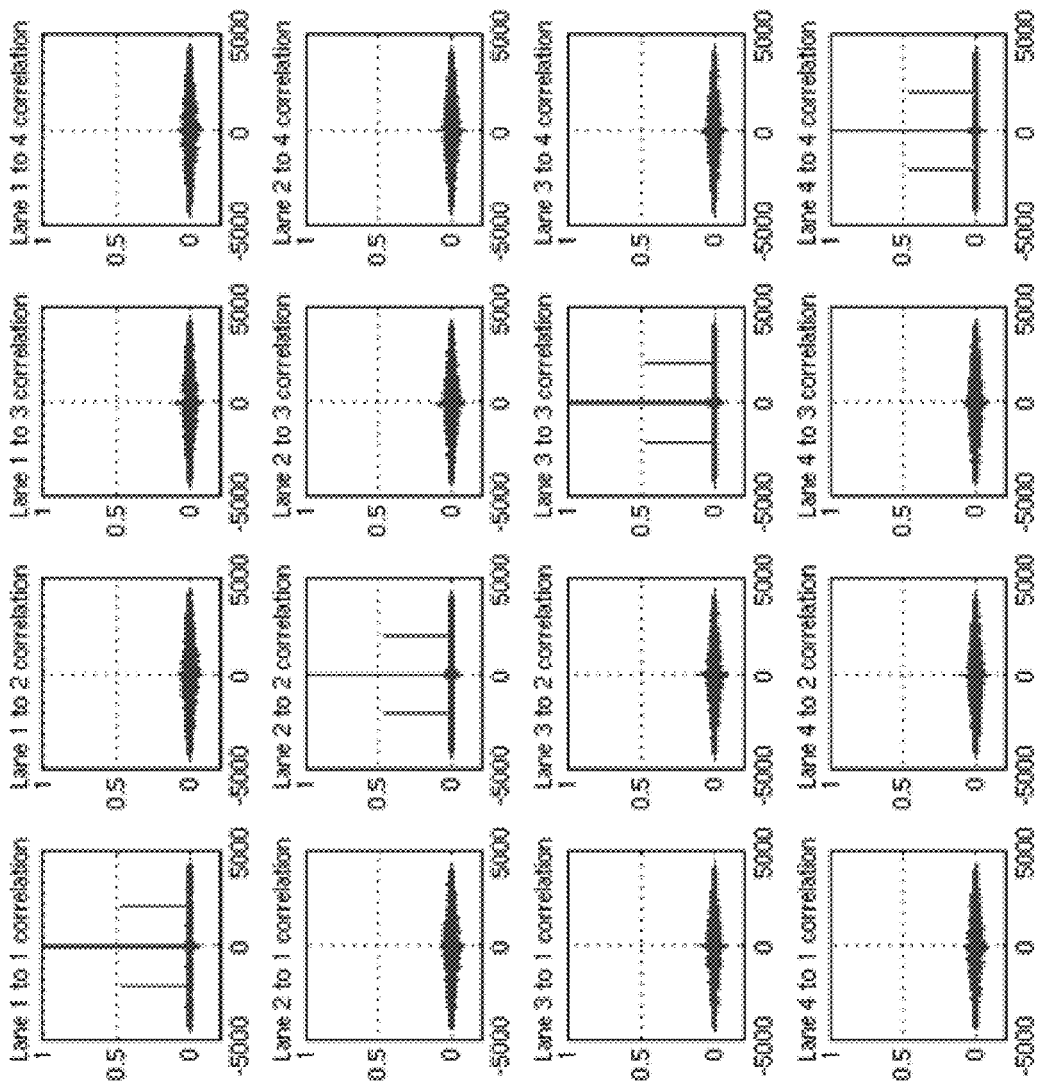
FIG. 8 is a graphic diagram illustrating substantially reduced cross-correlation between bit sequences when using training patterns generated through use of different PRBS11 polynomials.

The graphs in FIG. 8 illustrate the correlation between lanes using the exemplary set of PRBS11 polynomials defined in FIG. 6. As shown, there is very little correlation between patterns on pairs of lanes. (It is noted that the correlation between each lane and itself is high at an offset of zero, and low elsewhere, as also depicted here for comparison; this is a typical and desirable property of a training pattern.) In general, similar results may be obtained using different combinations of unique PRBS11 polynomials.

Figure 9:
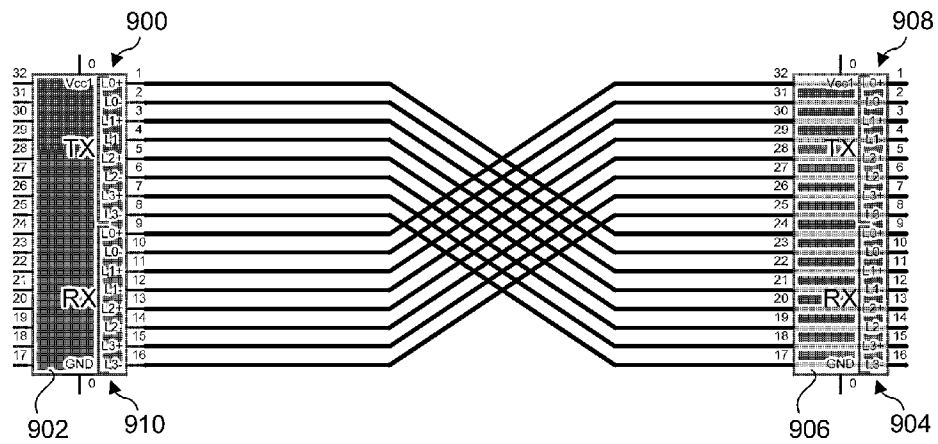
FIG. 9 is a schematic diagram illustrating crossing wiring paths in a circuit board coupling TX ports to RX ports in NIC chips at two link endpoints.

In addition to having cross-talk between lanes for a given link direction (FEXT), it is also possible to have cross-talk between lanes transmitting in opposing directions, such that a signal on a transmit lane of a device is coupled to a receive lane of the same device. This effect is referred to as near-end cross-talk, or NEXT. For example, FIG. 9 illustrates a situation under which the signal paths used for transmitting signals between a TX port 900 on a NIC chip 902 to an RX port 904 on a NIC chip 906 are routed on one plane in a backplane board such that they cross signal paths used for transmitting signals from a TX port 908 on NIC chip 906 to an RX port 910 on NIC chip 902 that are routed in another plane of the backplane board. An example of NEXT in the context of the link configuration of FIG. 1 is also illustrated in FIG. 1a. It addition to the potential for cross-talk between signals transmitted in opposing directions when they are routed in parallel, there may be additional potential for cross-talk where the signal paths overlap, such as within connectors and chip packages.

While the foregoing technique is well-suited for generating the training patterns for the four lanes of a 100GBASE-KR4 PHY or 100GBASE-CR4 PHY link in a given direction, it does not address the possibility that a transmitter could use one or more of the same PRBS11 polynomials used by the transmitter at the opposing end. Under the signal path routing shown in FIG. 9, as well as other signal path routing configurations, this could lead to NEXT appearing as ISI and leading to false adaptation, if there is correlation between the training patterns generated at the opposing transmitters. In one embodiment, to further improve de-correlation between PHYs, it is desirable to have different sets of polynomials (or their equivalent) at each of the two PHYs that comprise a link segment. As a result, each endpoint will have a unique training pattern signature.

Figure 10:
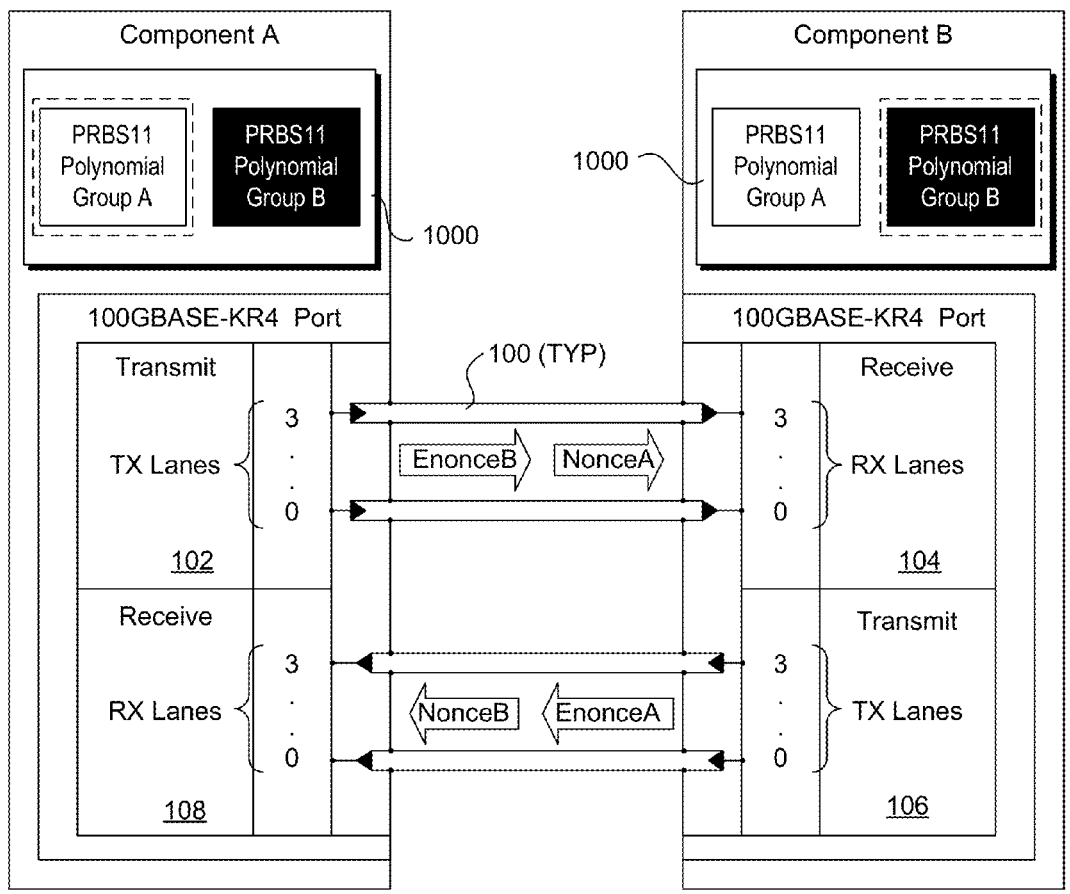
FIG. 10 is a schematic diagram illustrating a 100GBASE-KR4 link having link endpoints configured with PRBS11 polynomial sets divided into two groups and logic to select use of a different group of PRBS11 polynomials for each endpoint, according to one embodiment.
Figure 10:
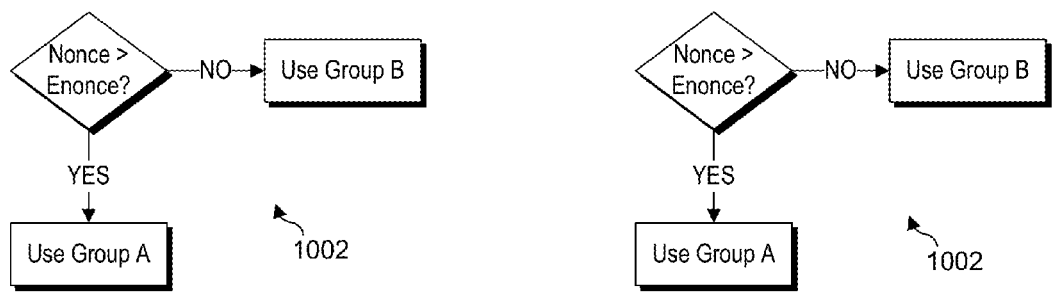

One embodiment of this scheme is illustrated in FIG. 10, which depicts TX and RX ports for endpoint components A and B that are configured in a similar manner to that shown in FIG. 1. Each of components A and B further includes a set of PRBS11 polynomials 1000, divided into two groups: Group A and Group B. As explained in further detail below, during link negotiation it is determined that one of the link endpoints will transmit its four training patterns using PRBS11 polynomials from Group A, while the opposing link endpoint will transmit its four training patterns using PRBS11 polynomials from Group B. Since there are no common PRBS11 polynomials in both groups, it is guaranteed that the PRBS11 polynomials used for each lane for the link will be unique, the sequences will be uncorrelated, and no false adaptation will occur.

In one embodiment, coordination of PRBS11 polynomial group usage is facilitated through use of the transmitted and echo nonce fields from an IEEE 802.3 Clause 73 auto-negotiation base page. According to Clause 73, the base Link Codeword (i.e., base page) is transmitted within a DME (Differential Manchester Encoding) page and conveys the encoding shown in FIG. 11, which is as follows.

D[4:0] contains the Selector Field. D[9:5] contains the Echoed Nonce field. D[12:10] contains capability bits to advertise capabilities not related to the PHY. C[1:0] is used to advertise pause capability. The remaining capability bit C[2] is reserved. D[15:13] contains the RF, Ack, and NP bits. D[20:16] contains the Transmitted Nonce field. D[45:21] contains the Technology Ability Field. D[47:46] contains FEC capability.

Echoed Nonce Field (E[4:0]) is a 5-bit wide field containing the nonce received from the link partner. When Acknowledge is set to logical zero, the bits in this field shall contain logical zeros. When Acknowledge is set to logical one, the bits in this field shall contain the value received in the Transmitted Nonce Field from the link partner.

Transmitted Nonce Field (T[4:0]) is a 5-bit wide field containing a random or pseudo-random number. A new value shall be generated for each entry to the Ability Detect state. The transmitted nonce should have a uniform distribution in the range from 0 to $2^5-1$. The method used to generate the value should be designed to minimize correlation to the values generated by other devices.

Figure 12:
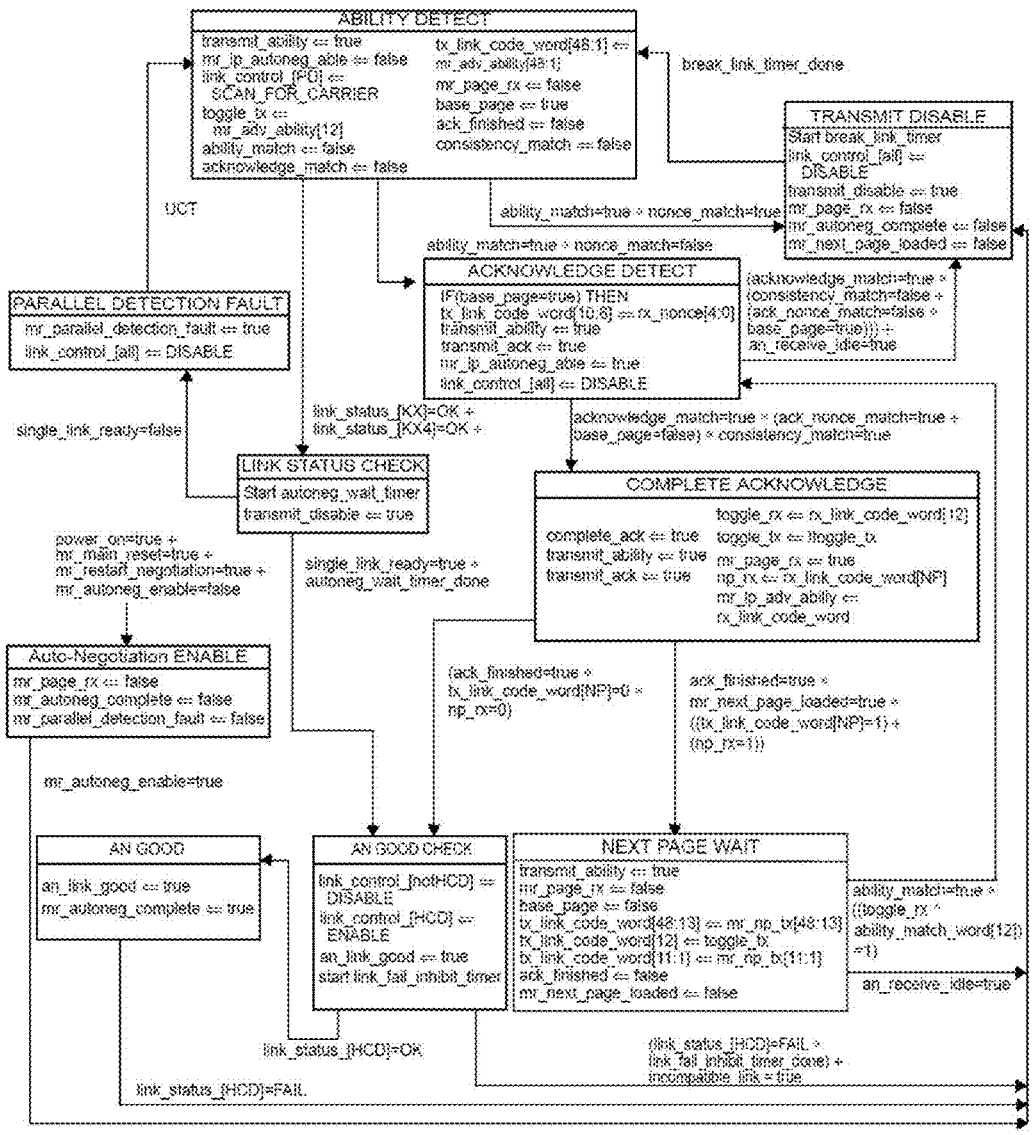
FIG. 12 is an arbitration state machine diagram including logic configured to prevents two devices that have a base-page match and the same nonce field from establishing link.

In one embodiment, during auto-negotiation, the two link endpoints generate nonce bits using a pseudo-random generator and exchange their nonce values with their partner. As shown in FIG. 12, an arbitration state machine employed during auto-negotiation prevents two endpoint devices that have a base-page match and the same nonce field from establishing link; if the nonce and echoed nonce are the same, the state machine transitions from Ability Detect to Transmit Disable and then back to Ability Detect, where new nonce values are chosen. In one embodiment, the PHY with the highest value in its nonce field takes polynomial group A, while the other PHY takes polynomial group B. As depicted toward the bottom of FIG. 10, each of components A and B include the same logic 1002, that is configured to determine whether the Transmitted Nonce Field (T[4:0]) is greater than the Echoed Nonce Field (E[4:0]) (which reflects the Nonce it receives from the other component). Use of the same logic and the fact that the two Nonce values must be different to establish link ensures that only one link endpoint will select group A, while the other will select group B. After the group is determined, different PRBS11 polynomials are selected from among that group at each endpoint for generating the training pattern for the four lanes coupled to the transmitter port of that endpoint.

In one embodiment, the following polynomials are used for one of the groups:

Lane 0: $1+x+x^5+x^6+x^{11}$
Lane 1: $1+x^2+x^5+x^6+x^{11}$
Lane 2: $1+x^3+x^5+x^7+x^{11}$
Lane 3: $1+x^4+x^5+x^7+x^{11}$ In one embodiment, the polynomials shown in FIG. 6 and discussed above are used for the other group.

Exemplary Implementation Environment and Blade Server Architecture

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 13a-c, and 14. Under a typical configuration, a rack-mounted chassis 1300 is employed to provide power and communication functions for a plurality of server blades (i.e., blades) 1302, each of which occupies a corresponding slot. (It is noted that all slots in a chassis do not need to be occupied.) In turn, one or more chassis 1300 may be installed in a blade server rack 1303 shown in FIG. 13c. Each blade is coupled to an interface plane 1304 (i.e., a backplane or mid-plane) upon installation via one or more mating connectors. Typically, the interface plane will include a plurality of respective mating connectors that provide power and communication signals to the blades, and including routed signal paths for coupling Ethernet signals between blades. Under current practices, many interface planes provide "hot-swapping" functionality—that is, blades can be added or removed ("hot-swapped") on the fly, without taking the entire chassis down through appropriate power and data signal buffering.

Figure 13A:
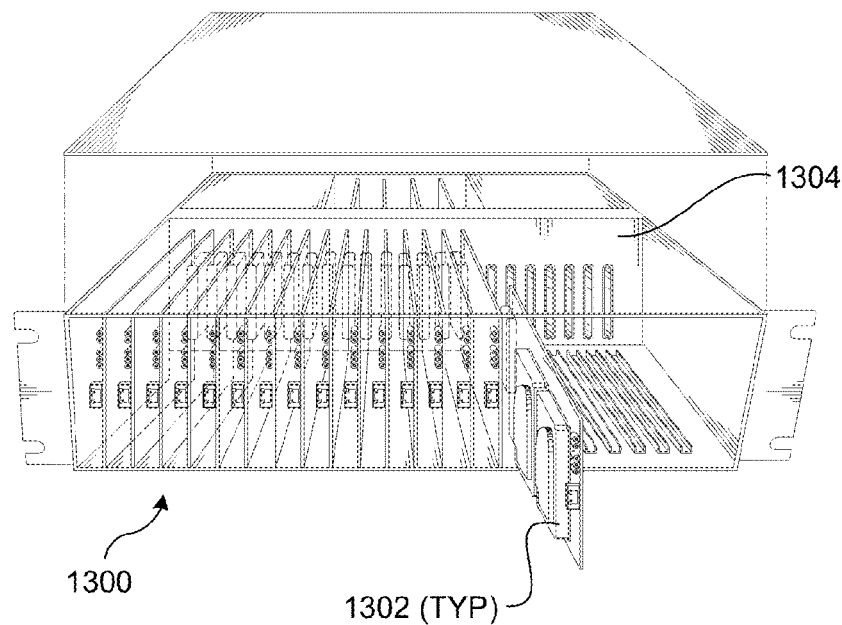
FIG. 13a is a frontal isometric view of an exemplary blade server chassis in which a plurality of server blades are installed.
Figure 13B:
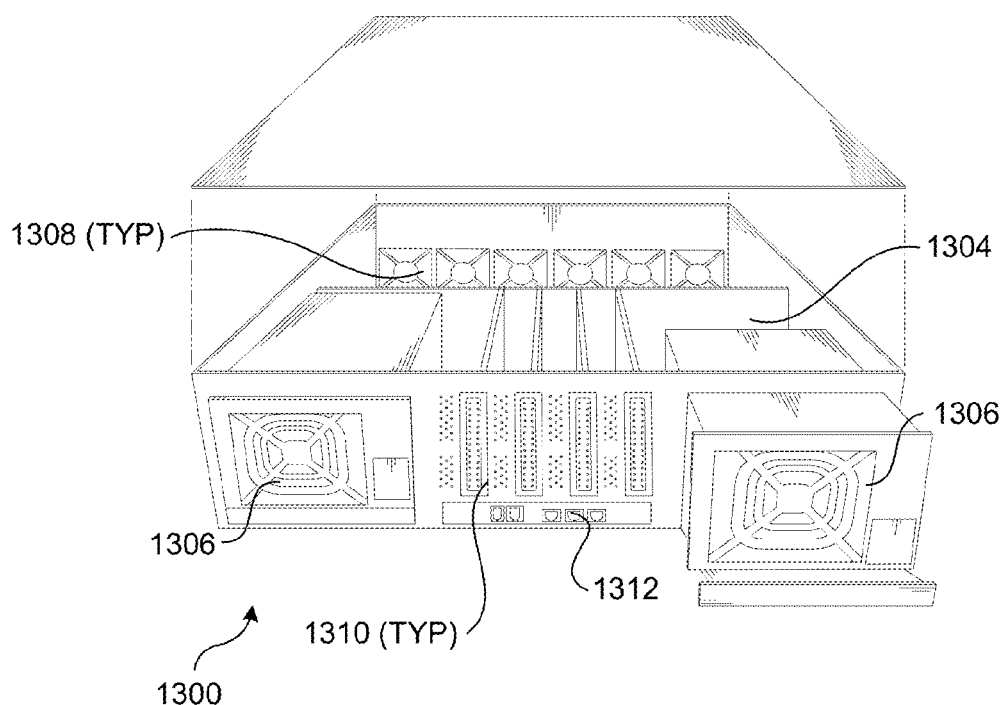
Figure 13C:
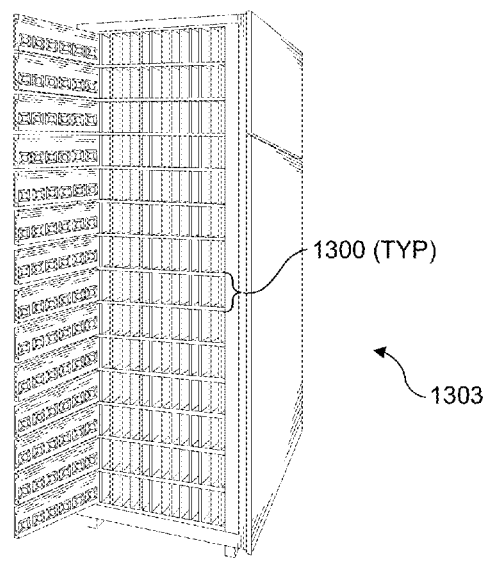
FIG. 13c is an isometric frontal view of an exemplary blade server rack in which a plurality of rack-mounted blade server chassis corresponding to FIGS. 16a and 16b are installed.

A typical mid-plane interface plane configuration is shown in FIGS. 13a and 13b. The backside of interface plane 1304 is coupled to one or more power supplies 1306. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1308 are employed to draw air through the chassis to cool the server blades.

An important feature required of all blade servers is the ability to communicate externally with other IT infrastructure. This is typically facilitated via one or more network connect cards 1310, each of which is coupled to interface plane 1304. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1312 that is coupled to the backside or frontside of the interface plane. As yet another option, a management or configuration server may be employed to manage blade activities, wherein communications are handled via standard computer networking infrastructure, for example, Ethernet.

Figure 14:
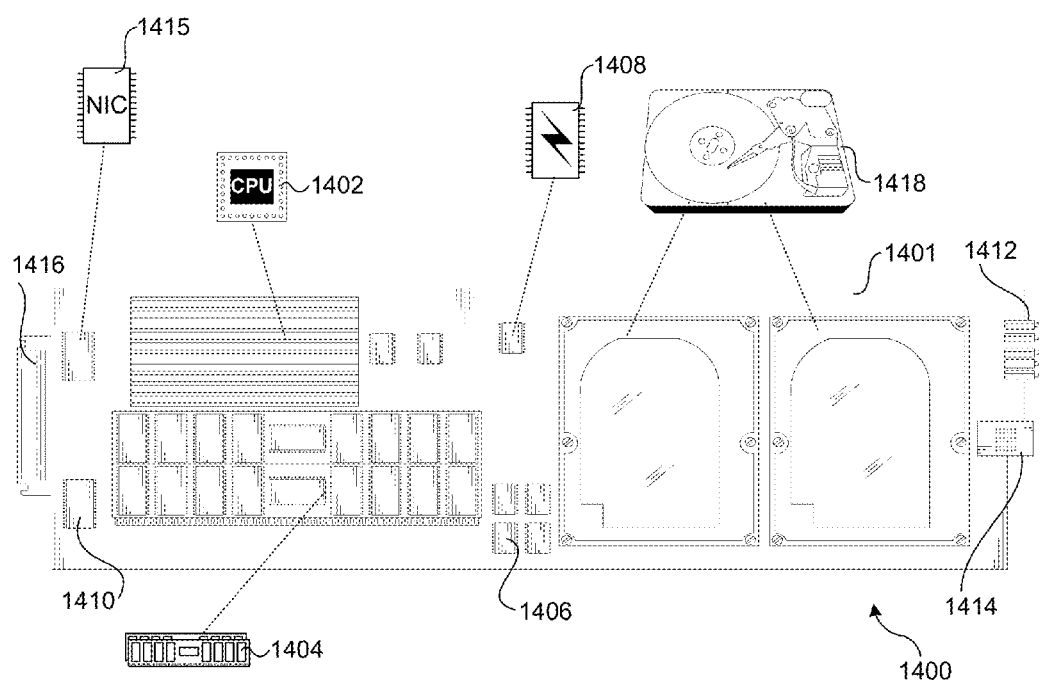
FIG. 14 shows details of the components of a typical server blade, according to one embodiment.

With reference to FIG. 14, further details of an exemplary blade 1400 are shown. As discussed above, each blade comprises a separate computing platform that is configured to perform server-type functions, i.e., is a "server on a card." Accordingly, each blade includes components common to conventional servers, including a main printed circuit board (main board) 1401 providing internal wiring (i.e., buses) for coupling appropriate integrated circuits (ICs) and other components mounted to the board. These components include one or more processors 1402 coupled to system memory 1404 (e.g., some form of Random Access Memory (RAM)), cache memory 1406 (e.g., SDRAM), and a firmware storage device 1408 (e.g., flash memory). A NIC (network interface controller) chip 1410 is provided for supporting conventional network communication functions, such as to support communication between a blade and external network infrastructure. Other illustrated components include status LED (light-emitting diodes) 1412, a set of RJ-45 console ports 1414 (only one of which is shown for simplicity), and a NIC 1415 coupled to an interface plane connector 1416. Additional components include various passive components (i.e., resistors, capacitors), power conditioning components, and peripheral device connectors.

Generally, each blade 1400 may also provide on-board storage. This is typically facilitated via one or more built-in disk controllers and corresponding connectors to which one or more disk drives 1418 are coupled. For example, typical disk controllers include SATA controllers, SCSI controllers, and the like. A solid state drive (SSD) may be used in place of disk drive 1418. As an option, the disk drives may be housed separate from the blades in the same or a separate rack, such as might be the case when a network-attached storage (NAS) appliance or backend storage sub-system that is employed for storing large volumes of data.

NIC 1410 comprises circuitry and logic for facilitating corresponding networking operations, such as support for physical layer (L1) and data link layer operations (L2). Typically, upper layer operations are facilitated by an operating system network stack that would be hosted by an operating system running on processor 1402. However, in some embodiments, a NIC may employ its own network stack via embedded logic or the like.

In a typical data center deployment, network switching elements comprise rack-mounted equipment, such as would occupy a 1U, 2U, or 4U slot, or may be implemented via one or more server blades. Optionally, a network switching element may be implemented use one or more server blades.

NIC 1415 comprises circuitry and logic for implementing high-speed communication between multiple blades 1400 via interface plane 1304. In one embodiment, NIC 1415 is configured to implement signaling and logic corresponding to the 100 Gbps embodiments disclosed herein, including circuitry and logic for implementing a 100GBASE-KR4 port or 100GBASE-CR port and associated link training operations. To further facilitate inter-blade communication over the 100GBASE-KR4, interface plane 1304 includes appropriate connectors, circuitry and wiring for facilitating the physical media aspect of the PHY (wiring not shown). For example, the circuitry may comprise connectors and wiring for facilitating signaling over 8 differential pairs in accordance with the configuration shown in FIG. 1.

In general, aspects of the link training embodiments disclosed herein may be implemented hardware (via, e.g., embedded logic), or via a combination of hardware and software. For example, a network element may include a processor running a software-based network stack and associated logic implemented via software for performing aspects of the operations described herein. Optionally, similar logic could be implemented via embedded logic in a NIC, large-scale network interface, or the like.

In addition to implementation in a blade server, the principles and teachings herein may be implemented via other types of equipment, such as telecommunications routers and switches. For example, a typical telecom switch comprises a rack with multiple cards coupled to a backplane, wherein the cards are generally analogous to the blades and the backplane is analogous to the interface plane in a blade server. Accordingly, the cards would be configured with circuitry and logic for implemented 100GBASE-KR4 or CR4 ports, and the backplane would include connectors, circuitry, and wiring for facilitating the physical media aspect of the 100GBASE-KR4 and CR4 PHYs.

Figure 15:
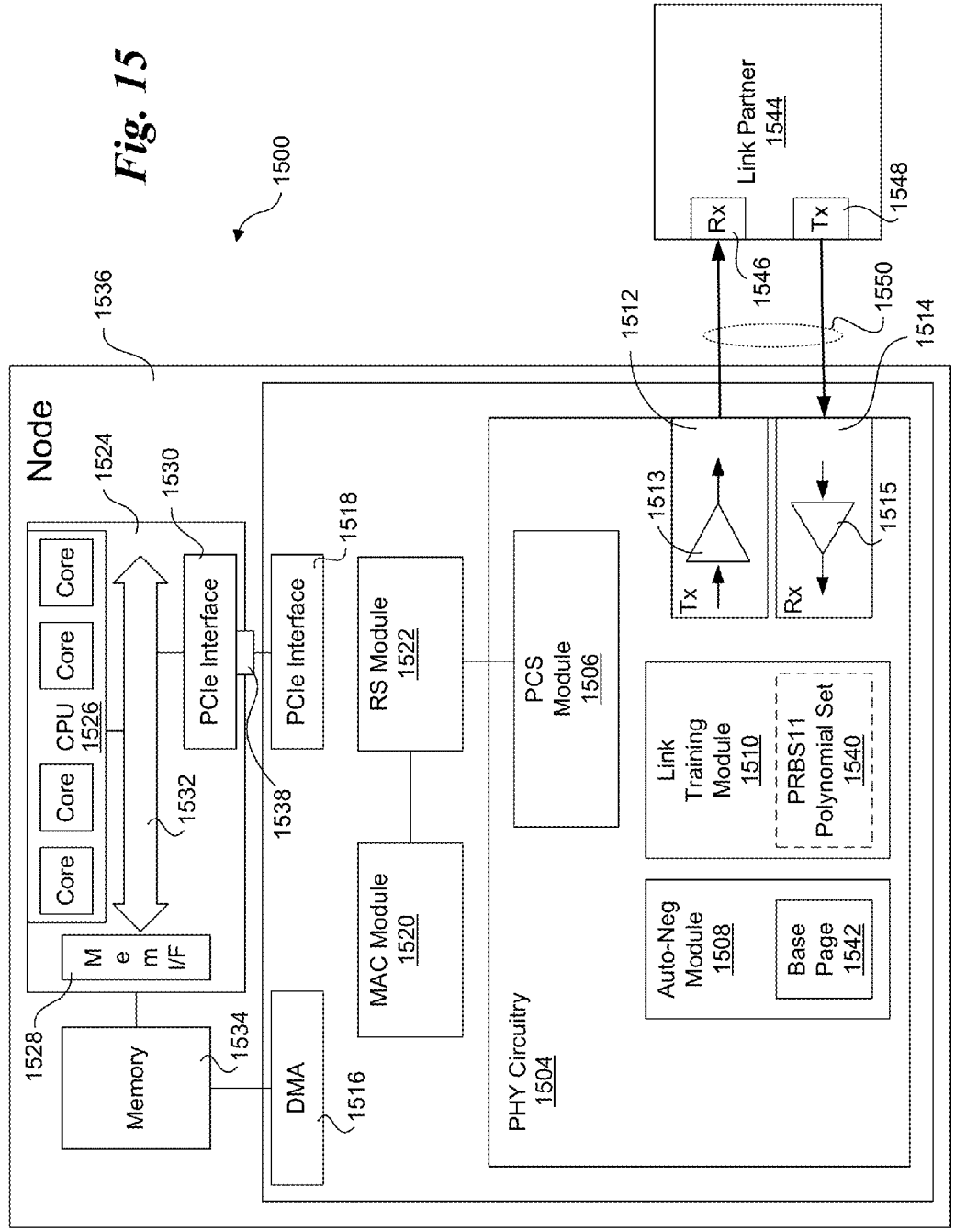

FIG. 15 shows an architecture 1500 for a network node employing a network chip 1502 configured to perform link training operations using de-correlated training patterns in accordance with aspects of the embodiments disclosed herein. Network chip 1502 comprises PHY circuitry 1504 including a Physical Coding Sublayer (PCS) module 1506, an auto-negotiation module 1508, a link training module 1510, a transmitter port 1512 including transmitter circuitry 1513 and a receiver port 1514 including receiver circuitry 1515. Network chip 1502 further includes a DMA (Direct Memory Access) interface 1516, a Peripheral Component Interconnect Express (PCIe) interface 1518, a MAC module 1520 and a Reconciliation Sublayer (RS) module 1522. Network node 1500 also comprises a System on a Chip (SoC) 1524 including a Central Processing Unit (CPU) 1526 having one or more processor cores, coupled to a memory interface 1528 and a PCIe interface 1530 via an interconnect 1532. Memory interface 1528 is further depicted as being coupled to memory 1534. Under a typical configuration, network chip 1502, SoC 1524 and memory 1534 will be mounted on or otherwise operatively coupled to a circuit board 1536 that includes wiring traces for coupling these components in communication, as depicted by single lines connecting DMA 1516 to memory 1534 and PCIe interface 1518 to PCIe interface 1530 at a PCIe port 1538.

In one embodiment, MAC module 1520 is configured to implement aspects of the MAC layer operations performed by embodiments described herein. Similar, RS module 1522 is configured to implement reconciliation sub-layer operations.

Link training module 1510 is further depicted as including a PRBS11 polynomial set 1540, which is configured in a similar manner to PRBS11 polynomial set 1000 in FIG. 10, including PRBS11 polynomials divided into groups A and B. Auto-negotiation module 1508 is further depicted as including a base page 1542. During link initialization, auto-negotiation module 1508 is implemented for auto-negotiation of link speed and capabilities. The auto-negotiation format consists of a base-page (e.g., base page 1542), which is the first set of formatted information exchanged with the link partner, as depicted by a link partner 1544 including a receiver port 1546 and a transmitter port 1548. In one embodiment the configuration of node 1500 and link partner 1544 are similar. In one embodiment, the format of base page 1542 is in accordance with the base page format defined in IEEE Std 802.3™-2012 (IEEE Standard for Ethernet). Link training module 1510 is further configured to perform link training operations relating to initialization for a link 1550 communicatively coupled between network chip 1502 and link partner 1544 in accordance with aspects of the embodiments disclosed herein.

In one embodiment, network chip 1502 comprises a 100 Gbps Ethernet Network Interface Controller (NIC) chip. However, the circuitry and components of network chip 1502 may also be implemented in other types of chips and components, including SoCs, multi-chip modules, and NIC chips including support for multiple network interfaces (e.g., wired and wireless).

In addition, embodiments of the present description may be implemented not only within a semiconductor chip such as a NIC, but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The use of Ethernet links in the foregoing embodiments is for illustrative purposes only, and is not to be construed as limiting. Rather, aspects of these embodiments may be implemented in various types of high-speed multi-lane links and interconnects, including but not limited to Infiniband™ links and high-speed serial interconnects, such as PCIe™.

The following examples pertain to further embodiments. In an embodiment, a method for facilitating link training for a high-speed link including multiple lanes is provided. The method includes implementing a link training pattern comprising a pseudo random bit sequence (PRBS) for each of the multiple lanes, and employing a different PRBS polynomial to generate the PRBS for the link training pattern for each lane. In an embodiment, each PRBS polynomial generates an 11-bit PRBS. In an embodiment the high-speed link comprises a 100 Gigabits per second Ethernet link. In an embodiment, the high-speed link comprises a physical media implemented via wiring in one of a mid-plane or backplane. In an embodiment, the high-speed link couples link endpoints via signal paths transferred via a cable.

In an embodiment, the high-speed link employs N lanes in each of two directions for a total of 2N lanes, further comprising employing different polynomials to generate the PRBS for each of the 2N lanes. In an embodiment the high-speed link couples first and second endpoints in communication, the method further comprising, and the method further includes storing a plurality of PRBS polynomials at each of the first and second endpoints, the plurality of PRBS polynomials being divided into multiple groups, employing PRBS polynomials from a first group for a transmit port at the first endpoint to generate training patterns for the N lanes from a transmit port of the first endpoint to a receive port of the second endpoint, and employing PRBS polynomials from a second group to generate training patterns for the N lanes from a transmit port of the second endpoint to a receive port of the first endpoint. In an embodiment, the method further includes performing a negotiation between the two endpoints to determine which of the first and second endpoints will employ PRBS polynomials from the first group and which endpoint will employ PRBS polynomials from the second group, wherein the negotiation guarantees that different groups of polynomials will be employed at the first and second endpoints. In an embodiment, the multiple groups comprise two groups comprising the first group and the second group, and the method further includes sending a first nonce from the first endpoint to the second endpoint, sending a second nonce from the second endpoint to the first endpoint, returning a first echoed nonce from the second endpoint to the first endpoint, the first echoed nonce being equal to the first nonce, returning a second echoed nonce from the first endpoint to the second endpoint, the second echoed nonce being equal to the second nonce, at each endpoint, comparing values of the nonce sent and the echoed nonce returned from that endpoint, and if they are equal, repeating the process with newly generated nonce values, and at each endpoint, using the result of comparing the final values of the nonce sent and the echoed nonce returned from that endpoint to determine whether to use the first group of PRBS polynomials or the second group of PRBS polynomials.

In accordance with further embodiments, apparatus are configured with means for performing the foregoing method operations. In an embodiment, the apparatus includes a high-speed communications interface including a transmit port and a receive port, the transmit port configured to transmit signals over multiple transmit lanes and the receive port configured to receive signals over multiple receive lanes, and a plurality of link training pattern generators, each configured to employ a pseudo random bit sequence (PRBS) polynomial to generate a PRBS link training pattern for a respective transmit lane, wherein the PRBS polynomial used to generate the link training pattern for each transmit lane is unique. In an embodiment, the multiple transmit lanes comprise four lanes, and the multiple receive lanes comprise four lanes. In an embodiment, the apparatus is further configured to store a plurality of PRBS polynomials and to select PRBS polynomials from amongst the plurality of PRBS polynomials for use by the plurality of link training pattern generators. In an embodiment, the apparatus comprises a network interface controller.

In an embodiment, the apparatus is further configured to store a plurality of PRBS polynomials divided into a first and second groups, and wherein, upon operation, the apparatus is configured to employ a link negotiation operation with a second apparatus comprises a link partner that also is configured to store the same plurality of PRBS polynomials divided into first and second groups by negotiating with the link partner to determine which of the apparatus and link partner is to employ PRBS polynomials from the first group, and which of the apparatus and link partner is to employ PRBS polynomials from the second group, wherein the link negotiation operation is implemented in a manner that guarantees that different groups of polynomials will be employed at the first and second endpoints.

In an embodiment, the apparatus is configured to perform the negotiation with the link partner by performing operations including sending a first nonce from the first endpoint to the second endpoint, sending a second nonce from the second endpoint to the first endpoint, returning a first echoed nonce from the second endpoint to the first endpoint, the first echoed nonce being equal to the first nonce, returning a second echoed nonce from the first endpoint to the second endpoint, the second echoed nonce being equal to the second nonce, and at each endpoint, comparing the first nonce and the second nonce to determine whether to use PRBS polynomials from the first group or second group.

In an embodiment, an apparatus comprises Physical Layer (PHY) circuitry, including a Physical Coding Sublayer (PCS) module, an auto-negotiation module, a link training module a transmitter port including transmitter circuitry for four transmit lanes, and a receiver port including receiver circuitry for four receive lanes. The apparatus further includes a Media Access Control (MAC) module, a Reconciliation Sublayer (RS) module, and a Peripheral Component Interconnect Express (PCIe) interface. The link training module is configured, when the apparatus is operating, to implement a link training pattern comprising a unique 11-bit pseudo random bit sequence (PRBS11) for each of the four transmit lanes, wherein a different PRBS11 polynomial is employed to generate the PRBS11 for the link training pattern for each lane.

In an embodiment, the apparatus is further configured to store a plurality of PRBS11 polynomials and to select four PRBS11 polynomials from amongst the plurality of PRBS11 polynomials for use in implementing the link training patterns for the four transmit lanes. In an embodiment, the four transmit lanes comprise lanes 0, 1, 2, and 3, and the PRBS11 polynomials comprise:

$1+x^5+x^6+x^{10}+x^{11}$ for lane 0;
$1+x^5+x^6+x^9+x^{11}$ for lane 1;
$1+x^4+x^6+x^8+x^{11}$ for lane 2; and
$1+x^4+x^6+x^7+x^{11}$ for lane 3.

In an embodiment, the apparatus is further configured to store a plurality of PRBS11 polynomials divided into first and second groups, and wherein, upon operation, the apparatus is configured to employ a link negotiation operation with a second apparatus comprises a link partner that also is configured to store the same plurality of PRBS11 polynomials divided into first and second groups by negotiating with the link partner to determine which of the apparatus and link partner is to employ PRBS11 polynomials from the first group, and which of the apparatus and link partner is to employ PRBS11 polynomials from the second group, wherein the link negotiation operation is implemented in a manner that guarantees that different groups of polynomials will be employed at the first and second endpoints. In an embodiment, the apparatus comprises a 100 Gigabits per second Ethernet Network Interface Controller.

In accordance with further embodiments, a system is configured to perform the foregoing method operations and implement aspects of the apparatus. In an embodiment, the system includes a chassis, an inter-plane, mounted within the chassis, having first and second inter-plane connectors and wiring coupled therebetween configured to facilitate a multi-lane 100 Gigabits per second (Gbps) Ethernet link, a first board having a first network interface controller (NIC) including 100 Gbps Ethernet transmitter and receiver ports operatively coupled to a first board connector that is coupled to the first inter-plane connector, and a second board having a second NIC including 100 Gbps Ethernet transmitter and receiver ports operatively coupled to a second board connector that is coupled to the second inter-plane connector. The 100 Gbps Ethernet transmitter for each of the first and second NICs is configured to transmit data over four transmit lanes, and the first NIC is configured, when the system is operating, to implement a link training pattern comprising a unique 11-bit pseudo random bit sequence (PRBS11) for each of the four transmit lanes, wherein a different PRBS11 polynomial is employed to generate the PRBS11 for the link training pattern for each lane.

In an embodiment of the system, each of the first and second NICs is further configured to store a plurality of PRBS11 polynomials divided into first and second groups, and wherein, upon operation, the first and second NICs are configured to employ a link negotiation operation to determine which of the first and second NICs is to employ PRBS11 polynomials from the first group, and which is to employ PRBS11 polynomials from the second group. In an embodiment, each of the first and second NICs are configured to perform link negotiation by performing operations including, sending a first nonce from the first endpoint to the second endpoint, sending a second nonce from the second endpoint to the first endpoint, returning a first echoed nonce from the second endpoint to the first endpoint, the first echoed nonce being equal to the first nonce, returning a second echoed nonce from the first endpoint to the second endpoint, the second echoed nonce being equal to the second nonce, and at each endpoint, comparing the first nonce and the second nonce to determine whether to use PRBS polynomials from the first group or second group.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for facilitating link training for a high-speed link including multiple lanes, comprising:
    implementing a link training pattern comprising an 11-bit pseudo random bit sequence (PRBS) for each of the multiple lanes; and
    employing a different 11-bit PRBS polynomial to generate the PRBS for the link training pattern for each lane,
    wherein the multiple lanes comprise four lanes 0, 1, 2, and 3, and the PRBS polynomials comprise,
    $1+x^5+x^6+x^{10}+x^{11}$ for lane 0;
    $1+x^5+x^6+x^9+x^{11}$ for lane 1;
    $1+x^4+x^6+x^8+x^{11}$ for lane 2; and
    $1+x^4+x^6+x^7+x^{11}$ for lane 3.

2. The method of claim 1, wherein the high-speed link comprises a 100 Gigabits per second Ethernet link.

3. The method of claim 1, wherein the high-speed link comprises a physical media implemented via wiring in one of a mid-plane or backplane.

4. The method of claim 1, wherein the high-speed link couples link endpoints via signal paths transferred via a cable.

5. The method of claim 1, wherein the high-speed link employs N lanes in each of two directions for a total of 2N lanes, further comprising employing different polynomials to generate the PRBS for each of the 2N lanes.

6. The method of claim 5, wherein the high-speed link couples first and second endpoints in communication, the method further comprising:
    storing a plurality of PRBS polynomials at each of the first and second endpoints, the plurality of PRBS polynomials being divided into multiple groups; and
    employing PRBS polynomials from a first group for a transmit port at the first endpoint to generate training patterns for the N lanes from a transmit port of the first endpoint to a receive port of the second endpoint; and
    employing PRBS polynomials from a second group to generate training patterns for the N lanes from a transmit port of the second endpoint to a receive port of the first endpoint.

7. The method of claim 6, further comprising performing a negotiation between the two endpoints to determine which of the first and second endpoints will employ PRBS polynomials from the first group and which endpoint will employ PRBS polynomials from the second group, wherein the negotiation guarantees that different groups of polynomials will be employed at the first and second endpoints.

8. The method of claim 7, wherein the multiple groups comprise two groups comprising the first group and the second group, the method further comprising:
    sending a first nonce from the first endpoint to the second endpoint;
    sending a second nonce from the second endpoint to the first endpoint;
    returning a first echoed nonce from the second endpoint to the first endpoint, the first echoed nonce being equal to the first nonce;
    returning a second echoed nonce from the first endpoint to the second endpoint, the second echoed nonce being equal to the second nonce;
    at each endpoint, comparing values of the nonce sent and the echoed nonce returned from that endpoint, and if they are equal, repeating the process with newly generated nonce values; and
    at each endpoint, using the result of comparing the final values of the nonce sent and the echoed nonce returned from that endpoint to determine whether to use the first group of PRBS polynomials or the second group of PRBS polynomials.

9. The method of claim 1, wherein each 11-bit PRBS polynomial employs a seed, and the seeds for the respective four lanes 0, 1, 2, and 3 are:
    10101111110 for lane 0;
    11001000101 for lane 1;
    11100101101 for lane 2;
    11110110110 for lane 3.

10. An apparatus comprising:
    a high-speed communications interface including a transmit port and a receive port, the transmit port configured to transmit signals over multiple transmit lanes and the receive port configured to receive signals over multiple receive lanes; and
    a plurality of link training pattern generators, each configured to employ an 11-bit pseudo random bit sequence (PRBS) polynomial to generate a PRBS link training pattern for a respective transmit lane, wherein the multiple lanes comprise four lanes 0, 1, 2, and 3, and the respective 11-bit PRBS polynomials comprise,
    $1+x^5+x^6+x^{10}+x^{11}$ for lane 0;
    $1+x^5+x^6+x^9+x^{11}$ for lane 1;
    $1+x^4+x^6+x^8+x^{11}$ for lane 2; and
    $1+x^4+x^6+x^7+x^{11}$ for lane 3.

11. The apparatus of claim 10, wherein the multiple transmit lanes comprise four lanes, and the multiple receive lanes comprise four lanes.

12. The apparatus of claim 10, wherein the high-speed network interface comprises a 100 Gigabits per second Ethernet interface.

13. The apparatus of claim 10, wherein the apparatus is further configured to store a plurality of PRBS polynomials and to select PRBS polynomials from amongst the plurality of PRBS polynomials for use by the plurality of link training pattern generators.

14. The apparatus of claim 10, wherein the apparatus is further configured to store a plurality of PRBS polynomials divided into a first and second groups, and wherein, upon operation, the apparatus is configured to employ a link negotiation operation with a second apparatus comprises a link partner that also is configured to store the same plurality of PRBS polynomials divided into first and second groups by negotiating with the link partner to determine which of the apparatus and link partner is to employ PRBS polynomials from the first group, and which of the apparatus and link partner is to employ PRBS polynomials from the second group, wherein the link negotiation operation is implemented in a manner that guarantees that different groups of polynomials will be employed at the first and second endpoints.

15. The apparatus of claim 14, wherein the apparatus is configured to perform the negotiation with the link partner by performing operations comprising:
sending a first nonce from the apparatus to the link partner;
receiving a second nonce from the link partner;
receiving a first echoed nonce from the link partner, the first echoed nonce being equal to the first nonce;
sending a second echoed nonce to the link partner, the second echoed nonce being equal to the second nonce; and
comparing the first nonce and the second nonce to determine whether to use PRBS polynomials from the first group or second group.

16. The apparatus of claim 10, wherein the apparatus comprises a network interface controller.

17. The apparatus of claim 10, wherein each 11-bit PRBS polynomial employs a seed, and the seeds for the respective four lanes 0, 1, 2, and 3 are:
10101111110 for lane 0;
11001000101 for lane 1;
11100101101 for lane 2;
11110110110 for lane 3.

18. An apparatus, comprising:
Physical Layer (PHY) circuitry, including,
a Physical Coding Sublayer (PCS) module;
an auto-negotiation module;
a link training module;
a transmitter port including transmitter circuitry for four transmit lanes; and
a receiver port including receiver circuitry for four receive lanes;
a Media Access Control (MAC) module;
a Reconciliation Sublayer (RS) module; and
a Peripheral Component Interconnect Express (PCIe) interface;
wherein the link training module is configured, when the apparatus is operating, to implement a link training pattern comprising a unique 11-bit pseudo random bit sequence (PRBS11) for each of the four transmit lanes, wherein a different PRBS11 polynomial is employed to generate the PRBS11 for the link training pattern for each lane.

19. The apparatus of claim 18, wherein the apparatus is further configured to store a plurality of PRBS11 polynomials and to select four PRBS11 polynomials from amongst the plurality of PRBS11 polynomials for use in implementing the link training patterns for the four transmit lanes.

20. The apparatus of claim 18, wherein the four transmit lanes comprise lanes 0, 1, 2, and 3, and the PRBS11 polynomials comprise:
$1+x^5+x^6+x^{10}+x^{11}$ for lane 0;
$1+x^5+x^6+x^9+x^{11}$ for lane 1;
$1+x^4+x^6+x^8+x^{11}$ for lane 2; and
$1+x^4+x^6+x^7+x^{11}$ for lane 3.

21. The apparatus of claim 18, wherein the apparatus is further configured to store a plurality of PRBS11 polynomials divided into first and second groups, and wherein, upon operation, the apparatus is configured to employ a link negotiation operation with a second apparatus comprises a link partner that also is configured to store the same plurality of PRBS11 polynomials divided into first and second groups by negotiating with the link partner to determine which of the apparatus and link partner is to employ PRBS11 polynomials from the first group, and which of the apparatus and link partner is to employ PRBS11 polynomials from the second group, wherein the link negotiation operation is implemented in a manner that guarantees that different groups of polynomials will be employed at the first and second endpoints.

22. The apparatus of claim 21, wherein the apparatus is configured to perform the negotiation with the link partner by performing operations comprising:
sending a first nonce from the apparatus to the link partner;
receiving a second nonce from the link partner;
receiving a first echoed nonce from the link partner, the first echoed nonce being equal to the first nonce;
sending a second echoed nonce to the link partner, the second echoed nonce being equal to the second nonce; and
comparing the first nonce and the second nonce to determine whether to use PRBS11 polynomials from the first group or second group.

23. The apparatus of claim 18, wherein the apparatus comprises a 100 Gigabits per second Ethernet Network Interface Controller.

24. The apparatus of claim 18, wherein each 11-bit PRBS polynomial employs a seed, and the seeds for the respective four lanes 0, 1, 2, and 3 are:
10101111110 for lane 0;
11001000101 for lane 1;
11100101101 for lane 2;
11110110110 for lane 3.

25. A system comprising:
a chassis;
an inter-plane, mounted within the chassis, having first and second inter-plane connectors and wiring coupled therebetween configured to facilitate a multi-lane 100 Gigabits per second (Gbps) Ethernet link;
a first board having a first network interface controller (NIC) including 100 Gbps Ethernet transmitter and receiver ports operatively coupled to a first board connector that is coupled to the first inter-plane connector;
a second board having a second NIC including 100 Gbps Ethernet transmitter and receiver ports operatively coupled to a second board connector that is coupled to the second inter-plane connector,
wherein the 100 Gbps Ethernet transmitter for each of the first and second NICs is configured to transmit data over four transmit lanes, and the first NIC is configured, when the system is operating, to implement a link training pattern comprising a unique 11-bit pseudo random bit sequence (PRBS11) for each of the four transmit lanes, wherein a different PRBS11 polynomial is employed to generate the PRBS11 for the link training pattern for each lane.

26. The system of claim 25, wherein the four transmit lanes of the first NIC comprise lanes 0, 1, 2, and 3, and the PRBS11 polynomials for the first NIC comprise:
$1+x^5+x^6+x^{10}+x^{11}$ for lane 0;
$1+x^5+x^6+x^9+x^{11}$ for lane 1;
$1+x^4+x^6+x^8+x^{11}$ for lane 2; and
$1+x^4+x^6+x^7+x^{11}$ for lane 3.

27. The system of claim 25, wherein each of the first and second NICs is further configured to store a plurality of PRBS11 polynomials divided into first and second groups, and wherein, upon operation, the first and second NICs are configured to employ a link negotiation operation to determine which of the first and second NICs is to employ PRBS11 polynomials from the first group, and which is to employ PRBS11 polynomials from the second group.

28. The apparatus of claim 25, wherein the first and second NICs are configured to perform the link negotiation by performing operations comprising:
- transmitting a first nonce from first NIC to the second NIC;
- transmitting a second nonce from the second NIC to the first NIC;
- transmitting a first echoed nonce from the second NIC to the first NIC, the first echoed nonce being equal to the first nonce;
- transmitting a second echoed nonce from first NIC to the second NIC; the second echoed nonce being equal to the second nonce; and
- comparing the first nonce and the second nonce at each of the first and second NICs to determine whether to use PRBS11 polynomials from the first group or second group.

29. The system of claim 25, wherein each 11-bit PRBS polynomial employs a seed, and the seeds for the respective four lanes 0, 1, 2, and 3 are:
- 10101111110 for lane 0;
- 11001000101 for lane 1;
- 11100101101 for lane 2;
- 11110110110 for lane 3.

\* \* \* \* \*